Figures 2, 3:
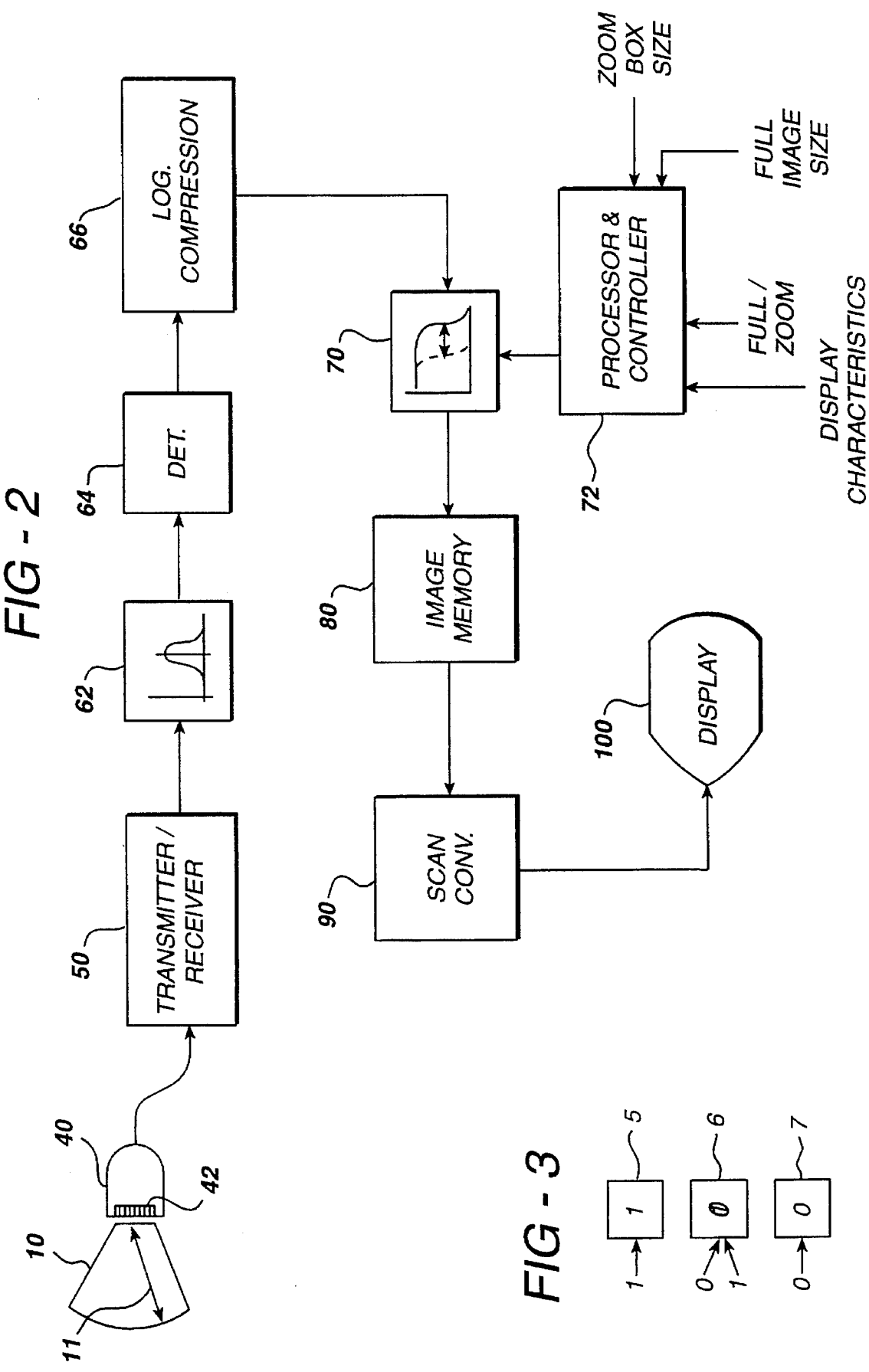

United States Patent [19]
Roundhill et al.

[11] Patent Number: 5,471,989
[45] Date of Patent: Dec. 5, 1995

[54] ULTRASONIC DIAGNOSTIC IMAGING WITH ENHANCED ZOOM

[75] Inventors: David N. Roundhill, Bothell; David W. Rust, Seattle, both of Wash.

[73] Assignee: Advanced Technology Laboratories, Inc., Bothell, Mass.

[21] Appl. No.: 321,693

[22] Filed: Oct. 12, 1994

[51] Int. Cl.⁶ .................................................... A61B 8/00
[52] U.S. Cl. .................................................... 128/660.04
[58] Field of Search ................ 128/660.01, 660.04, 128/660.05, 660.07; 73/609, 610, 611, 574

[56] References Cited

U.S. PATENT DOCUMENTS

| | | | |
|---|---|---|---|
| 4,063,549 | 12/1977 | Beretsky et al. | 73/574 |
| 4,182,173 | 1/1980 | Papadofrangakis et al. | 128/660.05 |
| 4,520,671 | 6/1985 | Hardin | 73/620 |
| 5,007,428 | 4/1991 | Watmough | 128/660.04 |

*Primary Examiner*—George Manuel
*Attorney, Agent, or Firm*—W. Brinton Yorks, Jr.

[57] ABSTRACT

An ultrasonic diagnostic imaging system is provided in which a portion of an ultrasonic image can be selected for enlarged display as a "zoom" image. When the image portion is displayed in its enlarged format, the bandwidth of a filter in the ultrasonic information path is extended to increase the information content of the image portion when displayed in its enlarged format. The bandwidth is continuously optimized to maximize information content in consideration of the characteristics of the display while preventing the generation of scintillation artifacts caused by attempts to display information of an excessive bandwidth.

13 Claims, 2 Drawing Sheets

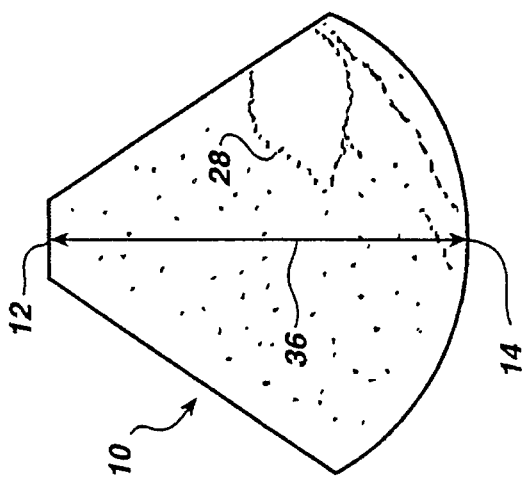
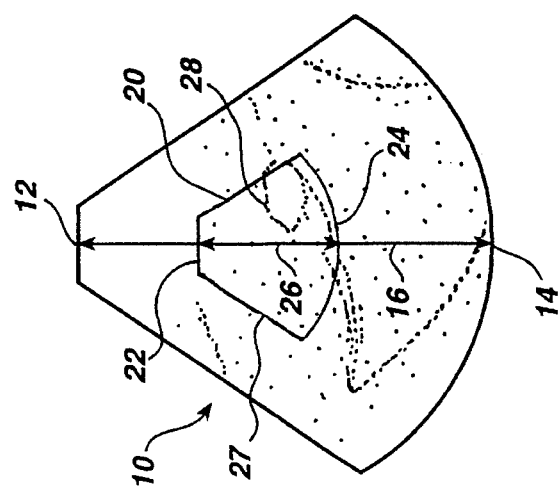
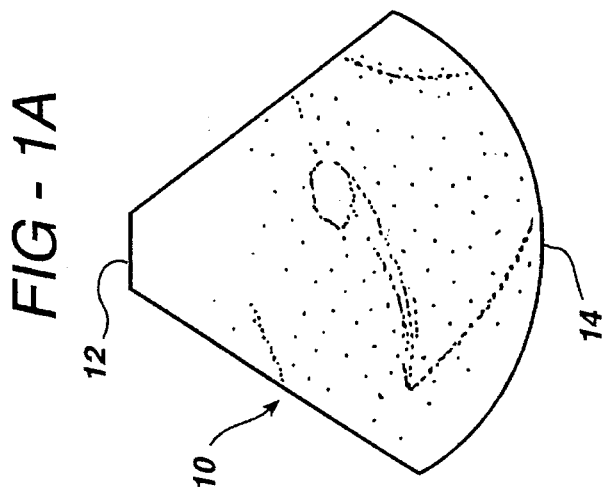

ULTRASONIC DIAGNOSTIC IMAGING WITH ENHANCED ZOOM

This invention relates to improvements in ultrasonic diagnostic imaging techniques, and in particular to ultrasonic imaging with improved capability to display an enlarged portion of an ultrasonic image, referred to herein as a "zoom" image.

Apparatus and techniques for displaying still and real time ultrasonic images and image sequences are well known. An ultrasonic transducer repetitively transmits beams of ultrasonic energy into the body of a subject being examined and receives echoes returning in response to these transmissions. In the case of planar two dimensional imaging the beams are transmitted over a planar region. The returning echoes are detected and spatially mapped in correspondence with the time of flight of ultrasound and the beam directions. The echoes are stored in an image memory and arranged in accordance with a display format such as a rectangular or sector display. The display of the echo information shows a structural or functional depiction of the anatomy of the plane of the subject.

Medical ultrasonic imaging systems have been commercialized with the capability of enlarging or zooming in on a portion of a displayed image. This may be done by allowing the user to outline a portion of an image which is desired to be enlarged. The outlined image portion is then displayed in the size of the original image. This may be done simply by mapping the outlined image portion to the larger area of the original image.

However, in blowing up a small portion of an image to display over a large area, it is desirable that the enlarged image portion show even greater detail than was seen in the original image. That is the usual purpose of an enlarged image, to reveal greater image detail. Simply displaying the same information in a greater size will not accomplish this.

It is also desirable that there be a correspondence between the display size and the image information of an enlarged or zoom image display. If the information content of the ultrasonic image to be displayed exceeds the capability of the display to show finely gradated information, the image can be contaminated with scintillation artifacts. Alternately, if the information content of the ultrasonic information is less than the capability of the display, the user may be provided with less visual information than it is possible to provide.

In accordance with the principles of the present invention, an ultrasonic image display technique is provided in which the image information is controlled to closely match the pixel density of the image display monitor. When a zoom command is issued by the user, commanding the imaging system to display an enlarged view of a portion of an image or real time image sequence, a filter characteristic is correspondingly varied to increase the information content of the ultrasonic image information in correspondence with the enlarged image size. The variation in information content which is provided to the image display is always maintained within limits that will prevent the occurrence of scintillation artifacts in the displayed image.

In the drawings:

FIGS. 1a, 1b, and 1c are illustrations of a sector image display with a zoom feature;

FIG. 2 is a block diagram of an ultrasonic image processing system constructed in accordance with the principles of the present invention; and FIG. 3 is an illustration of the cause of scintillation artifacts arising from an incompatibility between the content of information to be displayed and the capability of a display monitor.

Referring first to FIG. 1a, a typical ultrasonic image is shown. The illustrated image is shown in a sector format 10 which is developed by a transducer located at the top 12 of the image and scanning a plurality of angularly varying beams to a maximum display depth 14 at the bottom of the image. The resulting echoes with their spatial coordinates are displayed as FIG. 1a illustrates.

In FIG. 1b, the user has created a box 20 in the original image which outlines a portion of the image which is to be enlarged. Such a box could be rectangular, circular, or any other shape, but in this example the box is shown as having the same shape as the original sector. The box 20 extends from a top 22 at an upper depth to a bottom 24 at a greater depth. Whereas the original sector extended from the top 12 to the bottom 14 over a central dimension indicated by the full line 16, the zoom box 20 extends only over a portion of that dimension as indicated by the line segment 26 from the top of the box 22 to the bottom 24.

FIG. 1c shows the image area inside box 20 zoomed up to the size of the original full image. This allows structures such as that shown at 28 in the box 20 to be viewed in enlargement as shown in FIG. 1c. When enlarged, the central dimension 26 of the box 20 now extends from the top 12 of the image to the bottom 14 over the dimension 36 as shown in FIG. 1c.

It is desirable, of course, that when the image portion outlined by the zoom box 20 is enlarged, further detail of the enlarged image be revealed. If a physician is interested in closely examining the small structure 28 in the box 20 of FIG. 1b, the physician will want to see even greater detail in the structure 28 when it is enlarged as FIG. 1c shows. While it is desirable to display the greatest amount of image detail as possible, it is further desirable that this be done without the creation or introduction of any image artifacts.

A system for accomplishing these objectives in accordance with the principles of the present invention is shown in FIG. 2. An ultrasonic scanhead 40 containing a transducer array 42 scans an image sector 10 and receives echoes from the area of the sector. The transducer array is activated by a transmitter/receiver 50, which also receives and processes the echoes from the array and produces a sequence of echo signals from along the scan lines 11 of the sector 10. In an analog system the output of the transmitter/receiver will be a continuous analog signal for the duration of reception from a scan line. In a digital system the output of the transmitter/receiver will be a sequence of digital samples of the received echoes from along the scan line.

The echo signals are filtered by a bandpass filter 62, then detected by a detector 64, producing baseband echo signals. The detected echo signals are subjected to log compression by log compression circuit 66. In accordance with the present invention the echo signals are low pass filtered by a variable low pass filter 70. The filtered echo signals are stored in an image memory 80, and converted into the desired format for display by a scan converter 90. The image is then displayed on a display 100. A central processor and controller 72 is connected to every subsection of the system (not shown) to control the timing and interaction of the various processing subsections of the system.

In accordance with the principles of the present invention the bandwidth of the low pass filter 70 is varied in correspondence with the size and pixel density of the display area over which the image information is to be displayed. The information content of the image data is proportional to its bandwidth. In the case of the enlargement of a zoom box as shown by FIGS. 1a–1c, the bandwidth is extended to filter the image data at a higher bandwidth limit when the small box area is enlarged to the size of a full image. The higher bandwidth limit will allow signals of a higher information content to be passed on to the display than was the case when the area of the box comprised only a portion of a larger image, at which time the signals comprising the area of the box were subjected to a narrower bandwidth limit. Thus, when the small area of the zoom box is enlarged, it will also be displayed with a greater amount of detail, consistent with the expectation of the user.

Inputs to the processor and controller 72 which are used to set the bandwidth of the low pass filter 70 are shown in FIG. 2. The input labeled "zoom box size" informs the controller 72 as to the size of the zoom box 20, and the input labeled "full image size" informs the controller 72 as to the size of the original full image. This enables the processor and controller 72 to determine the relative proportions of the full and zoom image areas from which the magnitude of the bandwidth change is determined. The "full/zoom" input determines whether the image has been enlarged or not, informing the controller whether the bandwidth needs to be changed and in which sense, greater or lesser. The input labeled "display characteristics" provides data as to certain properties of the image display, including the number of pixels along the lines of the displayed image. This information enables the processor and controller to determine how high the bandwidth of the low pass filter 70 can be set without creating scintillation artifacts.

FIG. 3 is a symbolic depiction of the problem of scintillation artifacts. In this figure there are four pieces of information represented by the vertical column of numbers 1, 0, 1, and 0. These four pieces of information are to be displayed in but three pixels, represented by the boxes 5, 6, and 7. The first number 1 in the column aligns with pixel 5 and is continuously displayed in that pixel, and the last number 0 in the column aligns with the pixel 7 and is continuously displayed in that pixel. The middle two numbers 0 and 1 overlap only one pixel, the center pixel 6. At times the center pixel will display a 0 and at other times it will display a 1. As a result, while the top and bottom pixels will steadily display their values, the display of the center pixel will flicker or scintillate back and forth between a 0 and a 1. The problem is that the information content of the column of numbers, four, exceeds the display capability of the three pixels.

In a preferred embodiment the system of FIG. 2 is a digital system and the low pass filter 70 is a digital filter. The filter 70 limits the bandwidth of the image data it receives and adjusts the data rate so that the number of echo values to be displayed closely matches the number of pixels used to display the data. For instance, assume that there are P pixels along the center line of the displayed image, the line 16 of FIG. 1b. The bandwidth of the low pass filter is set such that the information content does not exceed the capability of the video display, which is limited by the number of display pixels. If the low pass filter 70 is receiving K samples of image data to display over these P video pixels the image data is filtered such that the output data from the filter has a normalized bandwidth given by Filter bandwidth<P/2K The nature of the scintillation problem can be appreciated from a numeric example. Suppose that there are 400 pixels along the line 16, and that the low pass filter 70 receives a sequence of 512 data values to be displayed by these pixels. As FIG. 3 showed, a scintillation problem will arise if it is attempted to display 512 data values over only 400 pixels. But by limiting the bandwidth as described above, the information content of the information sent for display will not exceed the capability of the 400 pixels or cause the scintillation problem to arise.

When the zoom function is activated an expansion of the bandwidth occurs. Using the above example, suppose that there are 400 pixels along the line 16 of the full image in FIG. 1b, and that there are 100 pixels along the line 26 of the box 20. When the box 20 is enlarged to a full image size as shown in FIG. 1c, the information that was displayed over 100 pixels in the box 20 is now displayed over 400 pixels along the line 36. This expansion of the number of pixels enables the display of greater ultrasonic information content, and the bandwidth of the low pass filter 70 is extended to pass a greater number of video samples from the enlarged area to the pixels of the full display. Thus, a greater amount of information is now spread over a greater number of pixels, but of a reduced spatial area, thereby meeting the user's expectation of seeing greater detail in an enlarged zoom image. When the zoom function is deactivated to return to the original full image, the variable filter 70 is returned to its original narrower bandwidth so as to prevent the occurrence of scintillation artifacts in the original image.

It will be appreciated that the greatest bandwidth limits, and hence the greatest displayed information, will be obtained by considering the geometry of the display pixels. For instance a raster scanned display is formed of a number of horizontally scanned raster lines. The center line 26 of a sector display will cut orthogonally across the lines of a raster, but the other angled lines will cut across the raster lines at an angle that reduces the number of pixels intercepted and hence available for the display of a given angled display line. For example, if there are 100 pixels along the center line 26 of the box 20, there may only be 70 pixels along the line 27 at the lateral side of the box. Thus, the most detailed display without creating scintillation effects will vary the bandwidth of the filter 70 depending upon the angle of the ultrasonic scan lines with respect to their orientation with the pixels of the raster. The greatest bandwidth is used at the center of the raster, and lesser bandwidths are employed as the scan proceeds to either lateral side of center of the sector. In a rectangular format such as a linear display format, the ultrasonic scan lines are all orthogonal to the raster lines and parallel with each other, and hence there need be no bandwidth variation from line to line across the image.

What is claimed is:

1. An ultrasonic diagnostic imaging system in which ultrasonic echo information is displayed on an image display comprising:

a display exhibiting a given pixel density characteristic for displaying an ultrasonic image;

means for selecting a portion of said displayed ultrasonic image which is to be displayed in an enlarged manner;

means for displaying said selected portion of said displayed ultrasonic image in an enlarged manner on said display; and filter means, responsive to said selecting means, for varying the bandwidth of displayed ultrasonic information in correspondence with the enlargement of said selected portion and said display pixel density characteristic.

2. The ultrasonic diagnostic imaging system of claim 1, wherein said filter means comprises means for increasing the bandwidth of the displayed ultrasonic information when said information is displayed in an enlarged manner.

3. The ultrasonic diagnostic imaging system of claim 2, wherein said selecting means comprises means for outlining a portion of a displayed ultrasonic image to select said portion for display in an enlarged manner.

4. The ultrasonic diagnostic imaging system of claim 3, further comprising means, responsive to said selecting means, for displaying said selected portion in substantially the same image size as the image from which said portion was selected.

5. An ultrasonic diagnostic imaging system in which ultrasonic echo information is displayed on an image display comprising:

means for processing received ultrasonic echo information to produce a plurality of sequences of ultrasonic information signals each received over a spatial dimension extending from a shallow depth to a relatively deeper depth of a subject;

variable filter means, responsive to said sequences of ultrasonic information signals, for limiting the bandwidth of said signals;

image processing means, coupled to said variable filter means, for processing said bandwidth limited ultrasonic information signals to produce an ultrasonic image spatially extending from said shallow to said deeper depth;

display means, exhibiting a given pixel density characteristic, and coupled to said image processing means for displaying said ultrasonic image;

image zoom means, coupled to said image processing means, for selecting an area of said ultrasonic image extending over a portion of the depth dimension of said image for display as an enlarged image portion; and filter control means, responsive to the selection of an area of said ultrasonic image and coupled to said variable filter means, for varying the bandwidth limitation of said variable filter means in correspondence with said selected area and said given pixel density characteristic.

6. The ultrasonic diagnostic imaging system of claim 5, wherein said filter control means comprises means for increasing the bandwidth of said signals in response to display of an enlarged portion of said ultrasonic image, and for decreasing the bandwidth of said signals in response to resumed display of said ultrasonic image following display of said enlarged image portion.

7. The ultrasonic diagnostic imaging system of claim 5, wherein said image processing means is further responsive to said image zoom means for processing a selected area of said ultrasonic image for display in substantially the same size as said ultrasonic image in the depth dimension.

8. The ultrasonic diagnostic imaging system of claim 5, wherein said variable filter means is further responsive to said filter control means for causing sequences spatially located closer to the center of an image to exhibit a greater bandwidth than sequences spatially located to the lateral sides of an image.

9. The ultrasonic diagnostic imaging system of claim 5, wherein said display means includes a pixel display, and said variable filter means comprises means for limiting the bandwidth of said signals in relation to the number of pixels over which a sequence is to be displayed.

10. The ultrasonic diagnostic imaging system of claim 9, wherein said variable filter means further comprises means for limiting the bandwidth of the signals of a portion of a sequence displayed in an enlarged image portion in relation to the number of pixels over which said portion of a sequence is to be displayed.

11. The ultrasonic diagnostic imaging system of claim 10, wherein said processing means further comprises means for producing sequences of digital signal samples; and wherein said variable filter means comprises means for controlling the number of digital signal samples in a sequence to be not greater than the number of pixels over which said sequence is to be displayed.

12. The ultrasonic diagnostic imaging system of claim 10, wherein said processing means further comprises means for producing sequences of digital signal samples; and wherein said variable filter means comprises means for controlling the number of digital signal samples in a sequence to closely match the number of pixels over which said sequence is to be displayed.

13. The ultrasonic diagnostic imaging system of claim 5, wherein said variable filter means comprises a low pass filter with a variable cutoff frequency.

* * * * *